March 24, 1936. J. W. CALDWELL 2,035,298
AUGER BIT
Filed July 14, 1932 2 Sheets-Sheet 1
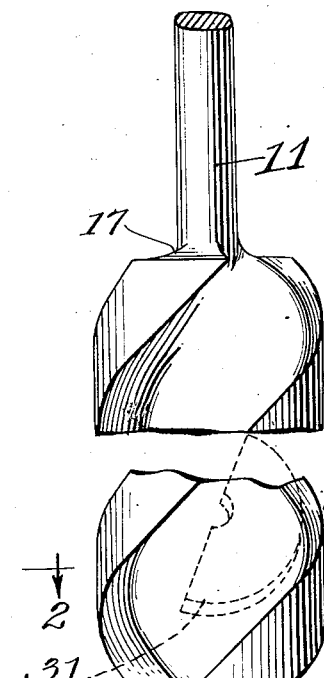
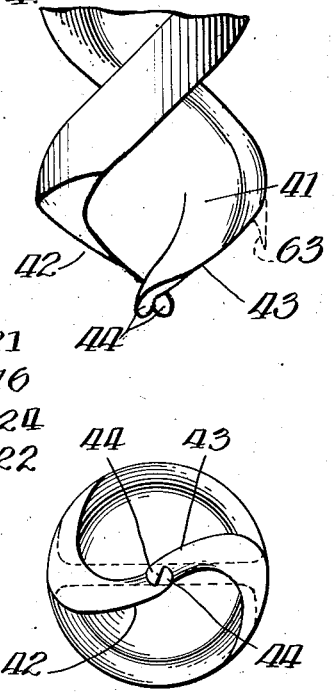
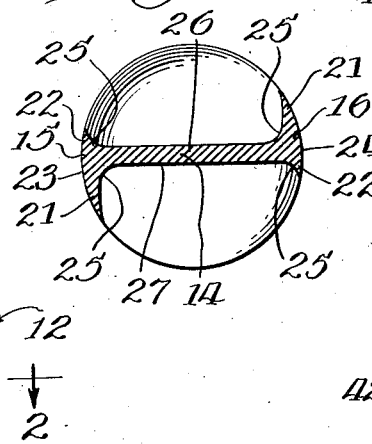
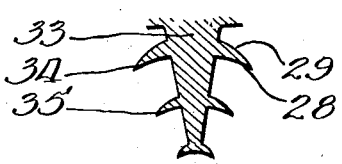
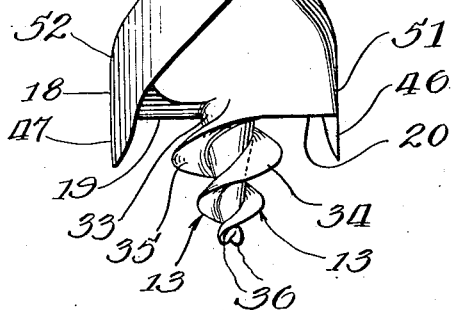
Inventor:
John W. Caldwell
By Stevens & Batchelor
Attys.

March 24, 1936.    J. W. CALDWELL    2,035,298
AUGER BIT
Filed July 14, 1932    2 Sheets-Sheet 2
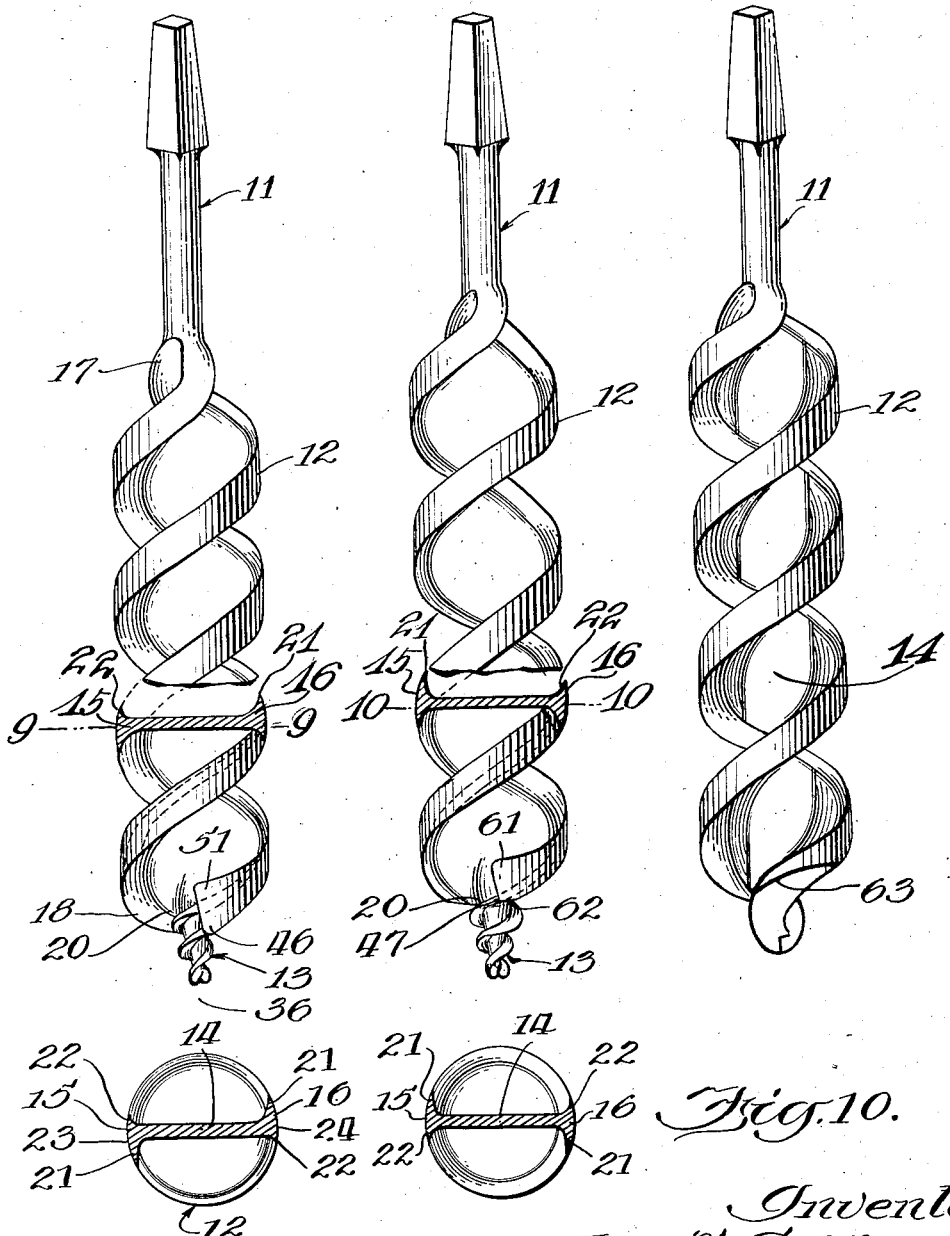

Patented Mar. 24, 1936

2,035,298

UNITED STATES PATENT OFFICE 2,035,298

AUGER BIT

John W. Caldwell, Chicago, Ill.

Application July 14, 1932, Serial No. 622,499

19 Claims. (Cl. 145—117)

This invention relates in general to a boring tool and more particularly to an auger bit and boring devices.

An important object of the invention is to provide an auger bit which will be more efficient than similar devices provided heretofore and such a device with which the boring of holes may be effected with a minimum of effort.

Another important object of the invention is to provide such a device which may be repeatedly filed or resharpened without change of form after the cutters and lead screw or point thereof has been damaged or after a fracture or breakage such as may ordinarily render the tool useless as a boring tool.

Another important object is to provide an auger bit having a maximum of chip clearance and which will not jam or become clogged with chips without sacrificing the strength of the tool, and such a device which will not waste power in operation.

Another important object is to provide such a device having a more efficient and dependable lead screw or point for drawing the cutting edges into the work without tearing out and without offering undue resistance to entering or to the operation of the tool.

Another important object is to provide an auger bit with which holes may be bored more rapidly, cleaner and with less effort and expense and which may be more economically manufactured.

Another important object is to provide an auger bit that will last longer, give more service and make a more perfect tool by improving and eliminating the trouble found in other similar tools.

Another important object is to provide an auger bit, the twist portion of body of which may be reversed or formed oppositely by merely reversing the forming tools or dies, etc. to make different types of bits and drills or boring tools from the same dies, etc.

Numerous other objects and advantages of the invention will be apparent as it is better understood from the following description, which, taken in connection with the accompanying drawings, discloses a preferred embodiment thereof.

Referring to the drawings:

Figure 1 is an enlarged and perpendicularly arranged longitudinal elevational view of a device embodying my invention, partly broken away.

Fig. 2 is a sectional view taken substantially on line 2—2 in Fig. 1, and illustrating a preferred cross-sectional form of the tool or end view when cut off.

Fig. 3 is a diagrammatic view illustrating the preferred form of lead screw threads.

Fig. 4 is a detail view of the end of the auger bit after shaping and dressing and as arranged to provide a boring or drilling tool terminating with twin cutting points, and indicating the position of the side cutter by dotted lines.

Fig. 5 is an end view of the boring tool shown in Fig. 4.

Fig. 6 is a perspective view of the auger bit shown in Fig. 1 and viewing the bit from the right, this form featuring an extension lip.

Fig. 7 is a similar view of a bit formed oppositely and without an extension lip and which is particularly adapted for boring in hardwood and the like.

Fig. 8 is a similar view of the tool shown in Fig. 4 as it appears from either side and more fully shaded for contrast of flat surfaces with curved ones; and Figs. 9 and 10 are sectional views taken substantially on lines 9—9 and 10—10 in Figs. 6 and 7 respectively and clearly showing the reversed web or twist portion.

To illustrate the invention I have shown an auger having a stem portion 11, a twist body portion 12, and a lead screw or point 13.

The stem portion 11 may be any suitable extension or shank such as round or square which may be engaged for operating the auger bit either by machine or hand brace.

It is an object of the invention to provide a web or twist portion 12 which will provide ample chip clearance and which will rapidly remove thick chips or cuttings without clogging and it is a further object to provide such a twist portion having sharp cutting or scraping edges preferably throughout the entire length of the twist and to provide a bit which may be re-sharpened or ground to form a drill point at any position intermediate the ends of said twist after the original lead screw 13 is destroyed or damaged or upon breakage of the cutters or of the twist at some intermediate position or point. To accomplish these and other objects the twist portion 12 is preferably formed of a central flat or web portion 14 terminating at its opposite ends in enlarged flange portions 15 and 16 and formed spirally substantially as shown, (Figs. 1 and 5) to substantially the form of a double thread screw, an end 17 of which terminates in the shank 11 and an end 18 of which is formed and dressed to provide substantially transverse and oppositely disposed cutting edges 19 and 20.

The flanges 15 and 16 (Fig. 2) are formed to provide oppositely disposed relatively sharp edge portions 21 and 22 extending laterally from the web 14, the edge portions 22 being relatively narrow and the leading or forward and scraping portions of the twist 12 and the edge portions 21 being relatively broad and the following or trailing edge portions of the twist for certain types of bits, the preferable relative proportions being about two to one. The position of these edge portions 21 and 22 are or may be reversed upon occasion and for other types of bits and drills as will be later described by merely reversing the dies, forming grinding tools or making the bit with dies held in an opposite direction.

The end surfaces 23 and 24 of the web flanges 15 and 16 are of curved cross-section and form the periphery of the tool and the inner faces 25 of all of the edge portions of the flanges 15 and 16 are preferably substantially parabolic in form or are formed and joined to surfaces 26 and 27 of the web 14 by parabolic curves or similar curves formed by circular arcs.

The effect of forming the web or twist portion 12 as above described is to produce a chip channel having a substantially flat bottom wall and a similar ceiling or top wall and to provide ample clearance for a chip 31 indicated in dotted lines (Fig. 1) or greater clearance for chips than the area of the chips made by the tool.

The point 13 which is herein termed a lead screw because of its function of drawing the cutting edges of the tool into the work is formed of a central conical core 33 and spiral threads 34 and 35 extending around the core 33.

The thread 34 preferably extends from the cutting edge 19 and the thread 35 extends from the cutting edge 20. These threads 34 and 35 extend spirally about the conical core 33 and terminate in a pair of oppositely disposed cutting lips 36 which preferably extend beyond the point of the core 33.

The thickness, or vertical dimension, of the threads 34 and 35 along the longitudinal axis of the core 33, and also the height, or radial extent of the projection of the threads beyond the core, are both decreased as the distance to the point or apex of the conical core 33 decreases. This is clearly shown in Figure 3 of the drawings and by reason of this structure, the threads cut deeper and deeper into the wood as the screw progresses. It is preferred that this decrease in height and thickness of the threads 34 and 35 be uniform and continuous; as the operation is thereby made smoother. However, it is obvious that slight departures from uniformity and continuity in this respect are contemplated as being within the scope of the invention. The upper surfaces 29 of the threads are preferably convex in profile and the lower surfaces 28 are similarly preferably concave. The pitch of the series of threads 34 and 35 is substantially uniform.

In the event that the lead screw 13 becomes damaged or the cutting end of the tool should be broken away or rendered useless and to provide a tool for drilling and boring in hard materials, the spiral twist may be cut to a suitable drill angle and in accordance with the desired pitch to form a drill point 41, (Figs. 4, 5 and 8) and in dressing or grinding the point 41 at a suitable angle to form sharp cutting edges 42 and 43, projecting cutting lips 44 are or may be formed to extend from the cutting edges 42 and 43 in overlapped relation as indicated, depending side cutters 63 also being provided if preferred, upon occasion. However, if the damage is slight, the construction of this bit permits it to be filed and restored to original shape.

In operation, the cutting lips 36 enter wood or like material readily and as the tool is rotated the threads 34 and 35 and the core 33 effect a gradual lateral expansion of the hole and thread grooves formed in the wood. The thread grooves are expanded upwardly and outwardly but the grooves are not materially altered in a forwardly or downwardly direction because of the undercut or concave forward faces 28 of the threads. Resistance to forward movement of the lead screw is thus reduced to a minimum and firm grip in the material for drawing the cutters of the tool into the work is insured. In ordinary auger bits and the like, expansion side cutters 46 and 47 are provided which are preferably relatively long, (as shown, Figs. 1 and 6), and relatively short upwardly extending side cutters are or may be provided.

For hard wood bits and the like, (Figs. 7 and 10), little or no extension cutters are required but a relatively long upper side cutter 61 (Fig. 7) is desirable. In forming such a tool the bit forming tools are reversed as above mentioned to form a long or broad upper edge portion 21 shifting the short or narrow edge 22 to the rear. The long side cutter 61 is formed from the edge portion 21 and the edge portion 22 is ground off if no extension cutters are required, as indicated at 62, (Fig. 7). The extension side cutters 46 and 47 and the upwardly extending cutters 51 and 52 are formed at the lower end of the bit from material provided by the flanges 15 and 16.

While the pitch of the spiral twist 12 may be any suitable or convenient pitch I prefer to provide a relatively steep pitch so that the chips will be rapidly removed from holes made by the tool. The form of the chip channels is such that there is no wedge shaped pocket formed between the wall or walls of the channels formed by the tool and the wall of the hole in which the chips may wedge or bind. By this arrangement clogging or binding of the chips in the channels is prevented even if they do become overlapped or congested in the channels.

It will be noted that in bits constructed in accordance with my invention the cutting edges are continuous and uninterrupted from the points of the cutting lips 36 until the chip is cut away clean and broken and that there is no unnecessary restriction or binding. It will also be noted that the shank of the lead screw is an extension of the bit web and that the side cutters may be formed from the flanges thereof at any point making it possible to form a new end or lead screw and side cutters at any point intermediate the ends of the twist body.

It will also be understood that the length and size of the lead screw may vary considerably according to the size of tool required while it may be preferable to use a lead screw like that of Fig. 1 with its threads extending around its core 1½ full turns for a ½ inch bit and 2½ turns on an inch bit yet a lead screw the same shape, etc. for a small bit or gimlet, one full turn of each thread is ample or half a full turn terminating in two small lips of such shape is ample for some tools such as reamers and small drills, gimlets, etc.

It is thought that the invention and many of its attendant advantages will be understood from the foregoing description, and it will be apparent that various changes may be made in the form, construction, and arrangement of the parts without departing from the spirit and scope of the invention, or sacrificing all of its material advantages, the form hereinbefore described being merely a preferred embodiment thereof.

I claim:

1. The combination with an auger bit, of a spirally threaded lead screw therefor the forward face of the thread of said lead screw being concave.

2. The combination with an auger bit, of a spirally threaded lead screw therefor the forward face of the thread of said lead screw being concave and formed to a uniform spiral pitch and the other face of said thread being of a convexly curved form.

3. An auger bit comprising, a spiral twist having a shank extending therefrom at one end and terminating in a cutter at the other end, the cross-sectional area of said twist comprising an extremely thin central web portion provided at each edge with opposed relatively broad and narrow lateral flanges.

4. An auger bit comprising, a spiral body portion having a shank extending therefrom at one end and terminating in a cutter at the other end, the cross-sectional area of said body comprising an extremely thin central web portion provided at each edge with opposed relatively broad and narrow lateral flanges, the inner surfaces of said flanges being of parabolic curvature.

5. In an auger bit, a spiral body having the form of an extremely thin flat web with relatively broad and narrow edge flanges in cross-section and arranged in spiral form terminating at one end in a pair of transverse and oppositely disposed cutters for boring holes, said web and flanges providing a pair of relatively large chip eliminating channels having substantially flat top and bottom surfaces at right angles to the channels, and a lead screw extending from said body having a conical core and spiral threads thereon, said threads originating at the cutters of said body and decreasing in size toward the apex of the conical core, and said threads also being concave on their under surfaces and convex on their upper surfaces to reduce resistance to forward movement and to force said threads into a tight gripping relation with the material bored.

6. An auger bit comprising, a spiral twist having a shank extending therefrom at one end and terminating in a cutter at the other end, the cross-sectional area of said twist comprising an extremely thin central web portion provided at each edge with opposed and oppositely arranged relatively broad and narrow lateral flanges.

7. An auger bit comprising, a spiral twist having a shank extending therefrom at one end and terminating in a cutter at the other end, the cross-sectional area of said twist comprising an extremely thin central web portion provided at each edge with opposed relatively broad and narrow lateral flanges, the broad flanges forming the forward edges of the twist.

8. An auger bit comprising, a spiral twist having a shank extending therefrom at one end and terminating in a cutter at the other end, the cross-sectional area of said twist comprising an extremely thin central web portion provided at each edge with opposed relatively broad and narrow lateral flanges, the narrow flanges forming the forward edges of the twist.

9. The combination with an auger bit of a spirally threaded lead screw therefor, the thread of said lead screw decreasing in height and in thickness as the distance to the point of the screw decreases, the screw point terminal of said thread being provided with a concavo-convex incising blade, the upper surface of said thread being convex in profile and the lower surface concave in profile.

10. The combination with an auger bit of a spirally threaded lead screw therefor, the thread of said lead screw decreasing in height and in thickness as the distance to the point of the screw decreases, the upper surface of said thread being convex in profile, and the screw point terminal of said thread being provided with a concavo-convex incising blade.

11. The combination with an auger bit of a spirally threaded lead screw therefor, the thread of said screw diminishing in height uniformly and continuously as the distance to the screw point decreases, and the upper and lower surfaces of said thread being convex and concave respectively.

12. A lead screw for an auger bit comprising a conical body portion and a pair of interspaced spiral threads thereon, the height and thickness of said threads decreasing uniformly and continuously as the distance to the screw point decreases, the upper surfaces of said threads being convex, the lower surfaces of said threads being concave, and the angle of departure of said upper and lower surfaces of said threads from the body portion being constant throughout the length of said threads.

13. An auger drill bit comprising a spiral twist terminating in a cutter at one end, the cross sectional area of said twist comprising a thin central web portion provided at each edge with opposed and oppositely arranged broad and narrow flanges, portions of said web at the cutter end being continued to form outwardly extending and angularly-depending cutting lips.

14. The structure of claim 13, said cutting lips extending in substantially opposite directions.

15. The structure of claim 13, said cutting lips extending in substantially opposite directions and having spiral curvatures to assume a threading motion during incision.

16. The structure of claim 13, said lips having spiral courses and rounded contours.

17. The structure of claim 13, said lips having spiral courses, concave under surfaces and convex upper surfaces.

18. A lead screw for a boring tool, said screw having at least one concavo-convex spiral thread thereon, said thread diminishing in height and thickness uniformly and continuously as the distance to the screw point decreases.

19. The combination with a boring tool of a lead screw therefor, at least one concavo-convex spiral thread on said lead screw, and the height of said thread being uniformly and continuously decreased as the distance to the screw point decreases.

JOHN W. CALDWELL.